UNITED STATES PATENT OFFICE.

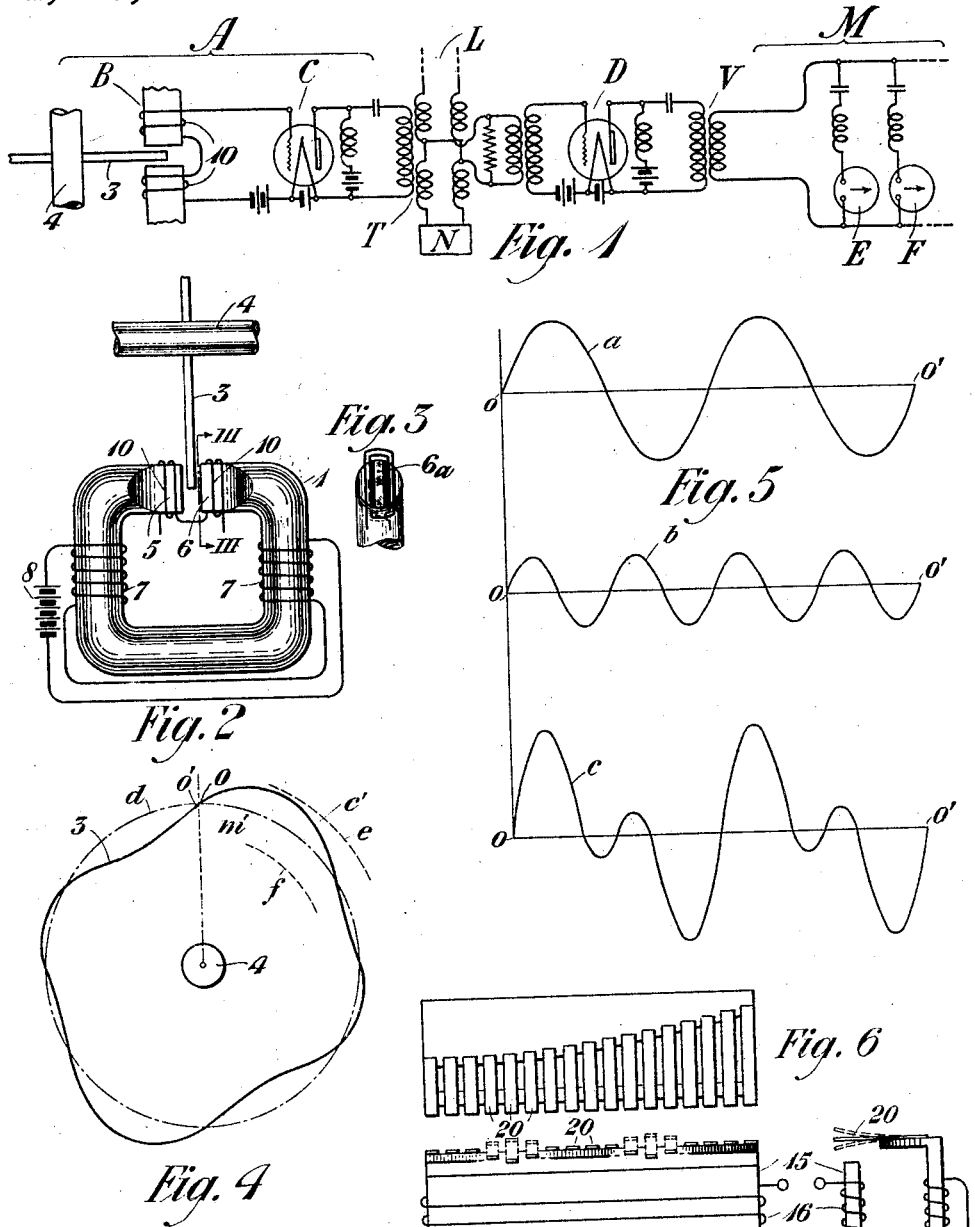

ALVA B. CLARK, OF BROOKLYN, NEW YORK, AND GEORGE CRISSON, OF HACKENSACK, NEW JERSEY, ASSIGNORS TO AMERICAN TELEPHONE AND TELEGRAPH COMPANY, A CORPORATION OF NEW YORK.

METHOD OF AND MEANS FOR DETERMINING UNBALANCE.

1,407,983.  Specification of Letters Patent.  Patented Feb. 28, 1922.

Application filed July 10, 1920. Serial No. 395,365.

*To all whom it may concern:*

Be it known that we, ALVA B. CLARK and GEORGE CRISSON, residing at Brooklyn and Hackensack, in the counties of Kings and Bergen and States of New York and New Jersey, respectively, have invented certain Improvements in Methods of and Means for Determining Unbalance, of which the following is a specification.

This invention relates to methods of and means for determining the unbalance between a pair of impedance devices. It is described herein with particular reference to the telephone and telegraph art, in which it is particularly useful, but it is to be expressly understood that the same is not thus limited in scope, being applicable to many widely different branches of the electrical art.

In telephone practice it is frequently necessary to determine the closeness of balance between a line and the balancing network thereof, not merely for any one particular frequency, but for an entire range of frequencies, such as that of the voice. This has usually been accomplished by making a series of unbalance determinations at different frequencies throughout the range. The object of the present invention is to provide apparatus whereby it is possible to secure unbalance indications for each of any desired number of different frequencies by means of a single measurement, so that the variations in the unbalance throughout any given frequency range may be readily ascertained.

A good understanding of the invention may now be had from the following description thereof, having reference to the accompanying drawings, in which Fig. 1 is a diagrammatic view of one form of circuit arrangement embodying the invention; Fig. 2, a partially diagrammatic view showing in elevation a part of the apparatus of Fig. 1; Fig. 3, a section of Fig. 2 along the line III—III looking in the direction of the arrows; Fig. 4, a view showing the outline of the disc 3 of Fig. 2; Fig. 5, diagrams of the voltage waves generated by the device of Fig. 2; and Figs. 6, 7, and 8, partially diagrammatic views showing in plan, front elevation and side elevation, respectively, a modified form of indicating instrument.

Similar characters of reference refer to similar parts in each of the several views.

In Fig. 1 of the drawing reference character A designates a source of a plurality of currents of different frequencies and predetermined relative amplitudes. This source, the parts of which are described hereinafter, is connected to the primary winding of a transformer T provided with two secondary windings the terminals of which are connected to the line L and the network N, respectively. The midpoints of the secondary windings of transformer T are associated with the input coil of an amplifier D, herein shown as of the well known electron tube type, the output circuit of which is associated by a transformer V with a measuring circuit, which comprises a number of parallel branches containing current indicating instruments E and F, which branches are sharply tuned by means of coils and condensers to the different component frequencies of the source A. In the present illustrative embodiment of the invention the source A is assumed, for simplicity, to generate only two frequencies of current so that only two indicating instruments, E and F, are required, but it will be understood that in general a greater number of frequencies of current will be employed in practical embodiments of the invention.

If the line and network are of the same impedance at both frequencies of source A the impedance drop is the same in each, so that the midpoints of the secondary windings are of equal potential and no current enters the amplifier D and the measuring circuit. If there is an impedance unbalance between L and N, however, current will enter amplifier D, the value of which current for each frequency will depend on the extent of the unbalance at the said frequency. This current is augmented in value by amplifier D and caused to enter the measuring circuit, wherein it is separated into its components by means of the tuned parallel branches. The readings of ammeters E and F therefore indicate the unbalance between L and N at the frequencies comprised in source A. The source A should preferably be so adjusted that the component frequencies thereof have equal amplitudes so that equal deflections of meters E and F indicate equal amounts of unbalance of the line and network, but, if these amplitudes are unequal, or if any part of the circuit transmits currents of one frequency with greater efficiency than current of another, the meters or other parts of the circuit may be adjusted so as to compensate for this inequality, the object being to secure like readings of the meters for like unbalances in impedance. The source A may be of any suitable construction and the invention is not limited to the employment of the arrangement illustrated.

In the present form source A consists of a generator B the voltage of which is impressed on amplifier C. The generator comprises a field magnet 1 and a soft steel inductor disc 3 mounted on a shaft 4, so spaced with reference to the magnet 1, that the edge of the disc revolves between the poles 5 and 6 of the magnet. A flux is set up in the field magnet by means of a winding 7 supplied with current from a battery or other source 8. The field magnet is tapered toward its poles, so that the pole faces are long and narrow, as illustrated at $6^a$ in Fig. 3. The disc 3 has an irregular outline, as shown in Fig. 4, so that as it revolves it fills the gap to a varying degree, thus bringing about a variation in the field flux in a manner determined by the outline of the disc. This variation in the flux induces an electromotive force in a winding 10 which covers the poles, the shape of the wave of this electromotive force being determined by the outline of the disc 3. This electromotive force is applied to the grid circuit of the amplifier C, the output current of which consequently has a wave shape similar to that of the impressed voltage. It should here be noted that because of the exceedingly high impedance of the grid circuit of the amplifier, the current in the winding 10 is so small that there is practically no distortion of the generated wave.

The disc 3 is shaped according to the current wave which it is proposed to draw from the source A. In the present illustration it is assumed that this current is to be comprised of two components, one having twice the frequency of the other, the amplitudes of the waves being substantially equal. To determine the outline of the disc for these conditions the two frequencies are plotted as curves $a$ and $b$, Fig. 5, the amplitude scale of $b$ being one-half that of $a$ because the generated voltage in coil 10 depends upon the rate of change of flux traversing the coil. This rate of change is twice as great for $b$ as for $a$, hence for substantially equal amplitudes of electromotive force the amplitude scale of $b$ should be half that of $a$. In general the amplitudes should be in inverse ratio to the corresponding frequencies. The waves $a$ and $b$ are added algebraically and the resultant is laid off as curve $c$. The next step consists in so shaping disc 3 that its outline corresponds to curve $c$. This may be done by dividing the circumference of the circle and the distance O—O′, Fig. 5, into a corresponding number of equal parts, and plotting the ordinates of the curve $c$ as radial distances from the mean circle $d$, of the disc. When, as in the present case, the amplitude scale of curves $a$ and $b$ has been so chosen that the maximum ordinate of curve $c$ is of such value that when plotted as radial distance from the circle $d$ it extends beyond the dotted circle $e$ and $f$, which show the maximum allowable variation in the outline of the disc, the distance between the circles being equal to the radial lengths of the pole faces, the ordinates should be proportionately reduced, so that the curve $c'$ falls well within the maximum limits indicated by $e$ and $f$.

The frequency of the generated wave depends on the speed of rotation of disc 3. It will be noted that the lower frequency, $a$, is represented in curve $c'$ in two complete cycles, so that two waves of this frequency are generated for each revolution of the disc. The speed of rotation of the disc should, therefore, be one-half the number of cycles per second in the fundamental frequency.

To secure symmetry in the shape of the disk and avoid unbalance forces as the same is rotated, there should be laid off on its outline at least two cycles of the fundamental frequency, but as many more cycles may be laid off thereon as it is convenient to use, it being readily understood that the greater the number of cycles on the disc, the smaller the speed of rotation.

In the foregoing example the two frequencies $a$ and $b$ are so plotted that the relative amplitudes of the corresponding components in the voltage wave are approximately equal, but it is readily understood that where other relative values of these amplitudes are desired they may be readily arrived at by plotting curves $a$ and $b$ to corresponding scales. Where an exact relation between the amplitudes is to be obtained the corresponding amplitudes in curves $a$ and $b$ may be arrived at by constructing discs with only one frequency on each, and varying the outline of each disc until the desired amplitudes are attained in the wave of generated voltage.

In place of the measuring circuit M of Fig. 1, consisting of a number of tuned parallel branches, I may employ other selective indicating apparatus such as the vibrating reed type of device shown in diagrammatic view in Figs. 6, 7 and 8. This device consists of a plate of soft iron bent into U-shape, as shown in Fig. 8, and provided with a winding 16. Reeds 20, of different natural periods of vibration, are mounted on one leg of the U, so as to bridge the space to the other leg thereof. These reeds serve to conduct the magnetic flux, which is caused to flow in plate 15 by winding 16, across the open part of the U. The alternations of the flux cause vibrations of the reeds, which vibrations are reinforced by the natural periods of such reeds as have the same natural periods as the frequencies of the currents in the winding 16. When, therefore, winding 16 is connected to transformer B and current is applied by source A to transformer T, the reeds which correspond to the component frequencies of source A will vibrate, provided the line and network are unbalanced and the amplitudes of their vibration will indicate the extent of the unbalance at their respective frequencies. In the present instance only two reeds need be provided, one corresponding to each frequency $a$ and $b$, but in the drawing a large number of reeds have been shown, corresponding to the case in which a large number of frequencies are impressed by the source A on the primary winding of transformer T.

Although only certain particular forms of embodiment of the invention are shown and described herein it is readily understood that various changes and modifications may be made therein within the scope of the following claims without departing from the spirit and scope of the invention.

What is claimed is:

1. The method of determining by a single measurement the frequency at which there is maximum unbalance between a pair of impedance devices, which consists in causing currents of a plurality of frequencies in a predetermined range to flow through said devices and enter a measuring circuit in substantial proportion to the unbalance at their respective frequencies, and causing the currents in said circuit to actuate indicating devices for showing simultaneously their relative values at the different frequencies.

2. The method of determining the variation in the unbalance between a pair of impedance devices for a given frequency range, which consists in causing currents of certain of said frequencies in said range to flow through said devices substantially simultaneously and enter a measuring circuit in proportion to the unbalance at their respective frequencies, and determining the relative values of current in said circuit at the said frequencies.

3. The method of determining simultaneously for a plurality of frequencies the extent of the unbalance between a pair of impedance devices, which consists in impressing on said devices, a current composed of said frequencies in predetermined relative amplitudes and determining for each frequency the difference between the drops of potential in the said impedance devices.

4. A device for giving simultaneously at each of a plurality of frequencies an indication of the impedance unbalance between a pair of electrical devices, which comprises a source of currents of different frequencies having predetermined relative amplitudes, a measuring circuit, means governed by said devices in accordance with the extent of unbalance existing therebetween for causing flow of current from said source into said measuring circuit, and means associated with said circuit for indicating simultaneously the relative currents of each of said frequencies in said measuring circuit.

5. A device for indicating simultaneously for each of a number of frequencies the impedance unbalance between a line and a network, which comprises a circuit associating said line and network in series, a source of current for said circuit composed of said frequencies in predetermined relative amplitudes, a measuring circuit associated with said first circuit at points having equal potential when said line and network are in balance, and frequency selective devices associated with said circuit for indicating the amount of current therein for each of said frequencies.

6. The method of generating a current composed of a plurality of frequencies of predetermined relative amplitudes, which consists in passing through the gap of a magnetic circuit a disc of magnetic material having an outline determined by the wave shape of the desired current, causing the resultant variations in the flux of the said magnetic circuit to act inductively on an electric circuit of high impedance, and amplifying the current in said circuit by energy from a separate source.

7. In combination, a magnetic circuit comprising a gap, means for causing a flow of flux in said circuit, poles comprised in said circuit having long and narrow pole faces so as to cause a wide and thin band of flux across said gap, a disc of magnetic material arranged to be passed through said gap with its edge between said poles so as to fill a portion of said gap, said disc having an outline determined in accordance with the wave of current to be obtained, an electric circuit of high impedance arranged to respond to the variations of flux in the said magnetic circuit, an output circuit, and means for causing in said output circuit a large flow of current similar in character to the small flow of current in said high impedance circuit.

8. In apparatus for measuring the difference in characteristics of two impedances simultaneously for a plurality of frequencies comprising a generator and an indicator, said generator including a disc of magnetic material having an outline determined by the wave form to be generated, a unilateral device on the input of which the generated wave form is impressed and to the output of which the impedances and the indicator are connected, said indicator being adapted to respond in proportion to the difference in characteristics of the impedances for the frequencies present in the generated wave form.

In testimony whereof, we have signed our names to this specification this 8th day of July, 1920.

ALVA B. CLARK.
GEORGE CRISSON.